US007168181B2

(12) United States Patent
Walchak

(10) Patent No.: US 7,168,181 B2
(45) Date of Patent: Jan. 30, 2007

(54) HAND TOOL APPARATUS AND METHOD

(76) Inventor: Norman J. Walchak, 105 Pryors La., Summerville, SC (US) 29485

( * ) Notice: Subject to any disclaimer, the term of this patent is extended or adjusted under 35 U.S.C. 154(b) by 0 days.

(21) Appl. No.: 11/071,501

(22) Filed: Mar. 3, 2005

(65) Prior Publication Data

US 2006/0196070 A1 Sep. 7, 2006

(51) Int. Cl.
*G01D 21/00* (2006.01)
*B25B 1/00* (2006.01)

(52) U.S. Cl. .......................... 33/647; 269/36; 269/904

(58) Field of Classification Search .................. 33/646, 33/647, 648, 649; 269/6, 36, 45, 156, 170, 269/203, 904
See application file for complete search history.

(56) References Cited

U.S. PATENT DOCUMENTS

| | | | | | |
|---|---|---|---|---|---|
| 359,833 | A | * | 3/1887 | Basinger | 269/203 |
| 478,306 | A | * | 7/1892 | Bacon | 33/649 |
| 2,889,632 | A | * | 6/1959 | Longhi | 33/648 |
| 3,490,152 | A | * | 1/1970 | Printz | 33/649 |
| 4,436,294 | A | | 3/1984 | Irelan | |
| 4,786,038 | A | * | 11/1988 | Ammons | 269/60 |
| 4,926,722 | A | | 5/1990 | Sorensen | |
| 5,009,134 | A | | 4/1991 | Sorensen | |
| 5,018,279 | A | * | 5/1991 | Williams | 33/649 |
| 5,022,137 | A | | 6/1991 | Sorensen | |
| 5,265,854 | A | * | 11/1993 | Whiteford | 269/3 |
| 5,443,246 | A | * | 8/1995 | Peterson | 269/283 |
| 5,584,458 | A | | 12/1996 | Rando | |
| 6,290,219 | B1 | * | 9/2001 | Barbosa | 269/156 |
| 6,367,160 | B1 | | 4/2002 | Rempe | |
| 6,367,787 | B1 | | 4/2002 | Poole | |
| 6,386,530 | B1 | | 5/2002 | Marks | |
| 6,412,767 | B1 | | 7/2002 | Beckmann | |
| 6,474,632 | B1 | | 11/2002 | Liou | |
| 6,648,314 | B1 | * | 11/2003 | Degen et al. | 269/6 |
| 6,648,315 | B1 | | 11/2003 | Lee | |
| 6,676,120 | B1 | | 1/2004 | Hallbeck | |
| 6,684,521 | B2 | | 2/2004 | Rempe | |
| 6,928,743 | B1 | * | 8/2005 | Marshall | 33/648 |
| 2003/0141644 | A1 | * | 7/2003 | Thomas | 269/6 |
| 2005/0121842 | A1 | * | 6/2005 | Lo | 269/6 |
| 2005/0280196 | A1 | * | 12/2005 | Ray Avalani | 269/6 |

* cited by examiner

*Primary Examiner*—R. Alexander Smith
(74) *Attorney, Agent, or Firm*—W. Pete Reid

(57) ABSTRACT

The present invention comprises a hand tool for the installation of elongated horizontally overlapping siding on a vertical framework.

14 Claims, 2 Drawing Sheets

HAND TOOL APPARATUS AND METHOD

BACKGROUND OF THE INVENTION

This invention relates generally to a hand tool of the type used to temporarily clamp together two articles, for example, for gluing, or to hold a workpiece for nailing or welding, and more particularly to a hand tool for the installation and proper spacing of elongated horizontally overlapping siding on a vertical framework having a quick-action bar clamp wherein the moving jaw can be rapidly advanced or advances in small increments of selectable length. The concept of a bar clamp is old and well-known. In recent years, quick-action handgrips have been incorporated for use in final tightening against the workpiece, for example, in U.S. Pat. No. 6,648,315 by Lee, U.S. Pat. No. 5,022,137 by Sorensen, U.S. Pat. No. 4,926,722 by Sorensen, U.S. Pat. No. 4,088,313 by Pearson, and U.S. Pat. No. 4,563,921 by Wallace. A disadvantage in these previous tools lies in the fact that none of the previous hand tools are capable of acting as a third-hand to assist the installation and proper spacing of elongated horizontally overlapping siding on a vertical framework.

The disadvantage of previous siding gauge tools, for example U.S. Pat. No. 6,684,521 by Rempe and U.S. Pat. No. 6,637,160 by Rempe, lies in the fact that adjustment of the tool either totally absent or cumbersome and imprecise. Further, these gauge tools are not easily nor quickly disengaged, nor are they capable of being operated by a single hand.

What is needed therefore, is a hand tool for the installation and proper spacing of elongated horizontally overlapping siding on a vertical framework having a quick-action bar clamp wherein the moving jaw can be rapidly advanced or advances in small increments of selectable length, and is operable using one hand with complete control by the operator at all times.

SUMMARY OF THE INVENTION

The present invention comprises a hand tool for the installation of elongated horizontally overlapping siding on a vertical framework, the siding having a top edge portion, a bottom edge portion, an interior face and an exterior face, the hand tool comprising: a stationary jaw; a movable jaw opposing the stationary jaw, the movable jaw having an interior jaw face and an exterior jaw face, the interior jaw face having a horizontal plate carried thereon, the exterior jaw face being substantially flat; a slide bar, having a first bar end and a second bar end with a portion therebetween, the movable jaw being carried on the first bar end, the slide bar being movable to bring the movable jaw toward and away from the stationary jaw; a housing, having an upper portion, a middle portion and a lower portion, the stationary jaw being carried on the upper portion of the housing, the middle portion having a channel formed therein for slidably receiving and supporting the slide bar, the lower portion having a handgrip; an adjustable arm carried on the upper portion of the housing adjacent the stationary jaw, for adjustably aligning an uninstalled siding piece about an installed siding piece; an adjustable stop member carried on one end of the adjustable arm, for supporting the uninstalled siding piece and preventing the uninstalled siding piece from sliding out of alignment with the installed siding piece; a single direction drive system having an advancement handle pivotably mounted to the housing in engageable contact with the drive system for releasably engaging the slide bar and when engaged, for advancing the slide bar and carried movable jaw toward the stationary jaw; and a retention system having a retention handle extending outwardly from the housing forwardly of the advancement handle for releasably disengaging, the retention slide bar normally engaging the slide bar, and when engaged preventing motion of the movable jaw away from the stationary jaw, and when disengaged, permitting motion of the movable jaw away from the stationary jaw, wherein the hand tool is grippable about the handgrip, the advancement handle and retention handle being selectively operable by the same hand, permitting a single person to manipulate long pieces of uninstalled vertical siding and properly position the long pieces of uninstalled siding relative to an installed piece of siding.

The present invention further comprises a method for manufacturing a hand tool for the installation of elongated horizontally overlapping siding on a vertical framework, the siding having a top edge portion, a bottom edge portion, an interior face and an exterior face, the hand tool comprising: providing a stationary jaw; providing a movable jaw opposing the stationary jaw, the movable jaw having an interior jaw face and an exterior jaw face, the interior jaw face having a horizontal plate carried thereon, the exterior jaw face being substantially flat; providing a slide bar, having a first bar end and a second bar end with a portion therebetween, the movable jaw being carried on the first bar end, the [slide] bar being movable to bring the movable jaw toward and away from the stationary jaw; providing a housing, having an upper portion, a middle portion and a lower portion, the stationary jaw being carried on the upper portion of the housing, the middle portion having a channel formed therein for slidably receiving and supporting the slide bar, the lower portion having a handgrip; providing an adjustable arm carried on the upper portion of the housing adjacent the stationary jaw, for adjustably aligning an uninstalled siding piece about an installed siding piece; providing an adjustable stop member carried on one end of the adjustable arm, for supporting the uninstalled siding piece and preventing the uninstalled siding piece from sliding out of alignment with the installed siding piece; a single direction drive system having an advancement handle pivotably mounted to the housing in engageable contact with the drive system for releasably engaging the slide bar and when engaged, for advancing the slide bar and carried movable jaw toward the stationary jaw; and providing a retention system having a retention handle extending outwardly from the housing forwardly of the advancement handle for releasably disengaging, the retention slide bar normally engaging the slide bar, and when engaged preventing motion of the movable jaw away from the stationary jaw, and when disengaged, permitting motion of the movable jaw away from the stationary jaw, wherein the hand tool is grippable about the handgrip, the advancement handle and retention handle being selectively operable by the same hand, permitting a single person to manipulate long pieces of uninstalled vertical siding and properly position the long pieces of uninstalled siding relative to an installed piece of siding.

DESCRIPTION OF THE PREFERRED EMBODIMENT

Figure 1:
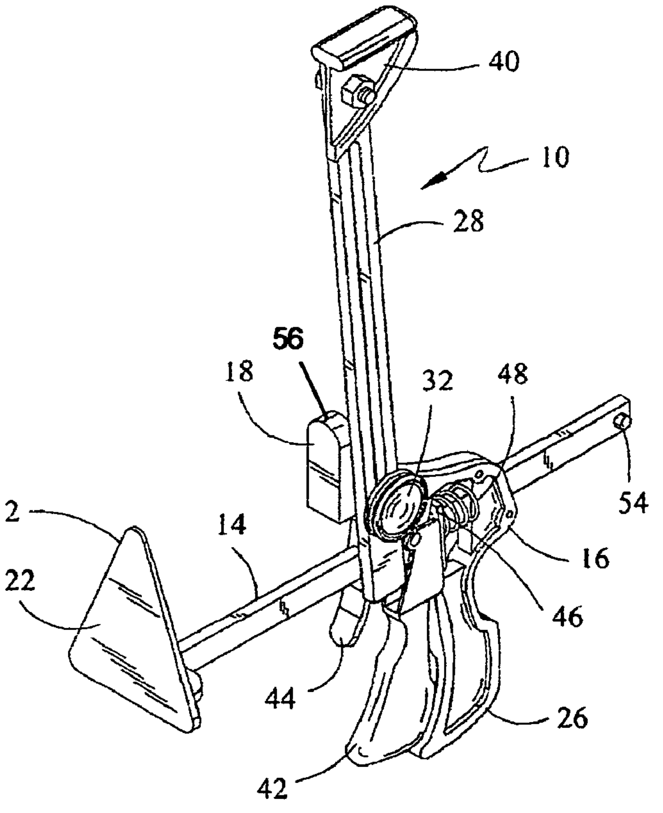
FIG. 1 is a perspective view illustrating a hand tool for the installation and proper spacing of elongated horizontally overlapping siding on a vertical framework having a quick-action bar clamp wherein the moving jaw can be rapidly advanced or advances in small increments of selectable length, in accordance with the invention.

With reference to the Drawings wherein like number indicate like elements, a hand tool shown generally at 10, includes a movable jaw 12 connected to a slide bar 14. The slide bar is slidably supported in a channel that passes through a housing assembly 16.

The movable jaw 12 opposes the stationary jaw 18, and has an interior face 20 and an exterior face 22. The interior face 20 of the movable jaw 12 carries a horizontal plate 24 for receiving and supporting a bottom edge portion of a siding piece to be clamped.

Slide bar 14 has a first bar end and a second bar end, with a bar portion therebetween. The movable jaw 12 is carried on the first bar end, the slide bar being movable to bring the movable jaw toward and away from the stationary jaw.

The housing assembly 16 includes an upper portion, a middle portion, and a lower portion. The stationary jaw 18 is carried on the upper portion of the housing assembly 16 opposing the moveable jaw 12. A channel is carried within the middle portion of the housing assembly 16 for slidably receiving and supporting the slide bar 14. The lower portion of the housing assembly 16 carries the handgrip 26.

The upper portion of the housing assembly 16 further carries an adjustable arm 28 adjacent the stationary jaw 18 for adjustably aligning and properly spacing an uninstalled siding piece about an installed siding piece. Arm 28 is preferably adjustable about at least one arm end with respect to the housing assembly. Arm 28 is adjustable vertically and angularly, allowing the tool variable sizing depending upon the height, thickness, and spacing requirements of the particular siding to be installed.

Figure 2:
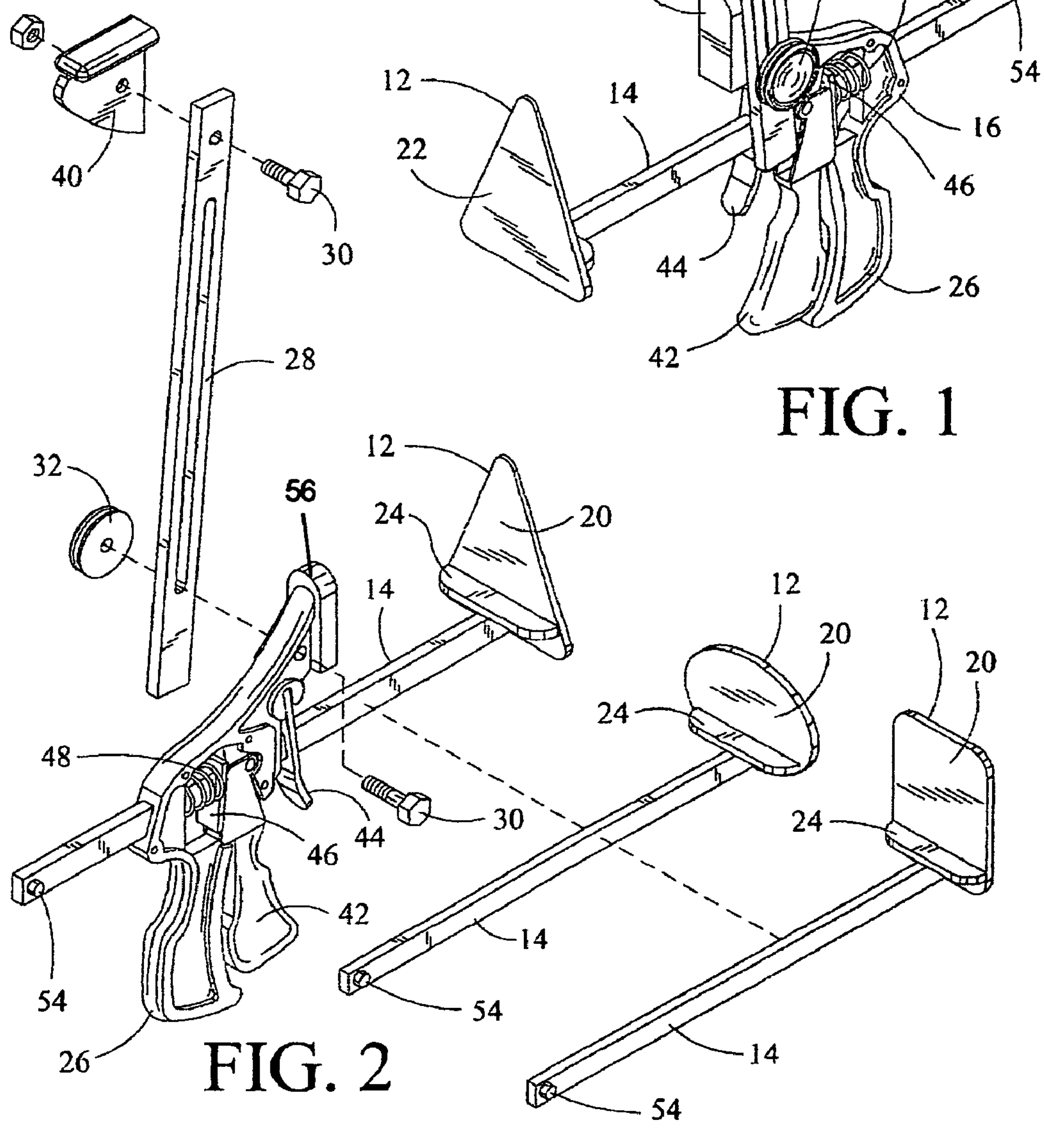
FIG. 2 is a partially exploded view illustrating the hand tool of FIG. 1, illustrating the attachment of adjustable arm and stop members and illustrating alternative embodiments for the configuration of the movable jaw, in accordance with the invention.
Figure 3:
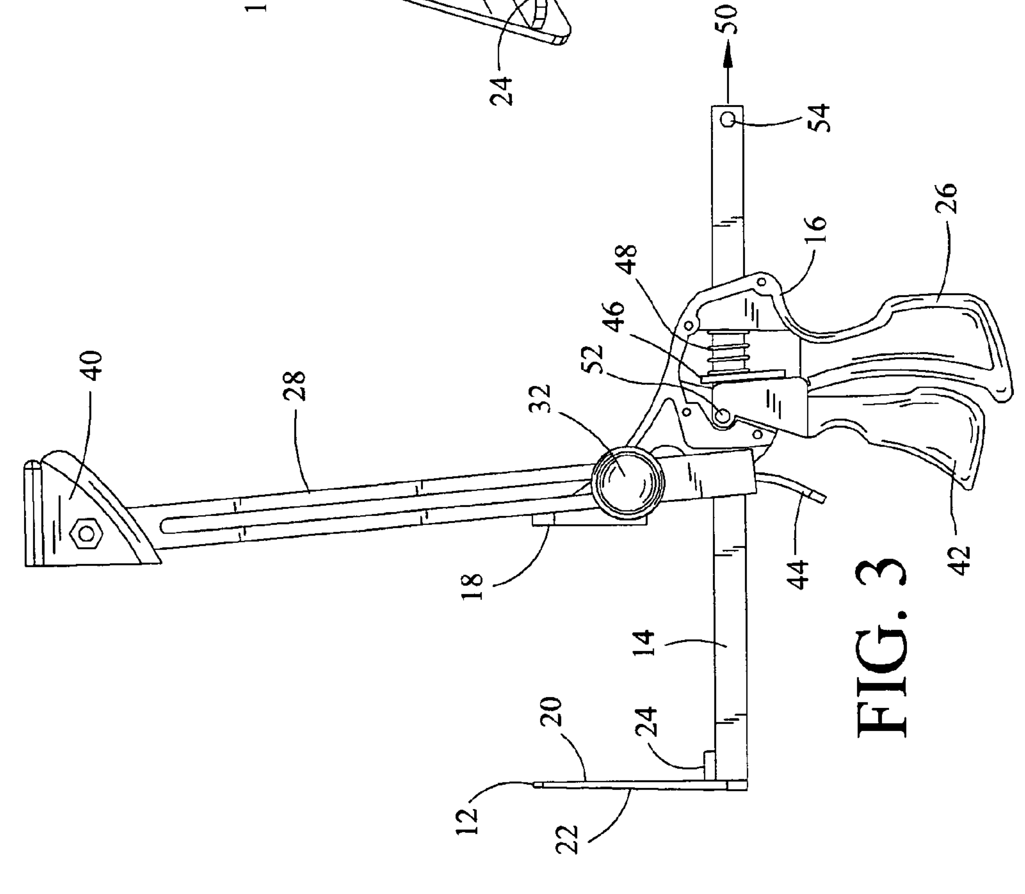
FIG. 3 is a side elevational view illustrating the hand tool of FIG. 1, in accordance with the invention.

In an embodiment as illustrated in FIG. 1-3 the arm 28 maybe slotted and is adjustably secured to the housing assembly via a fastener assembly. In this embodiment illustrated the fastener assembly comprises a set screw 30 and a threaded knob 32. To adjust the arm 28 the threaded knob 32 is rotated counterclockwise to reduce the frictional grip on the set screw 30 and knob 32 against the arm 28. The arm 28 is then free to move, both vertically and angularly, and may be adjusted to its desired position. To secure the arm 28 in its desired position the threaded knob 32 is rotated clockwise to increase the frictional grip of the set screw 30 and knob 32 against the arm 28, thereby adjustably securing the arm 28 to the housing assembly 16.

Figure 4:
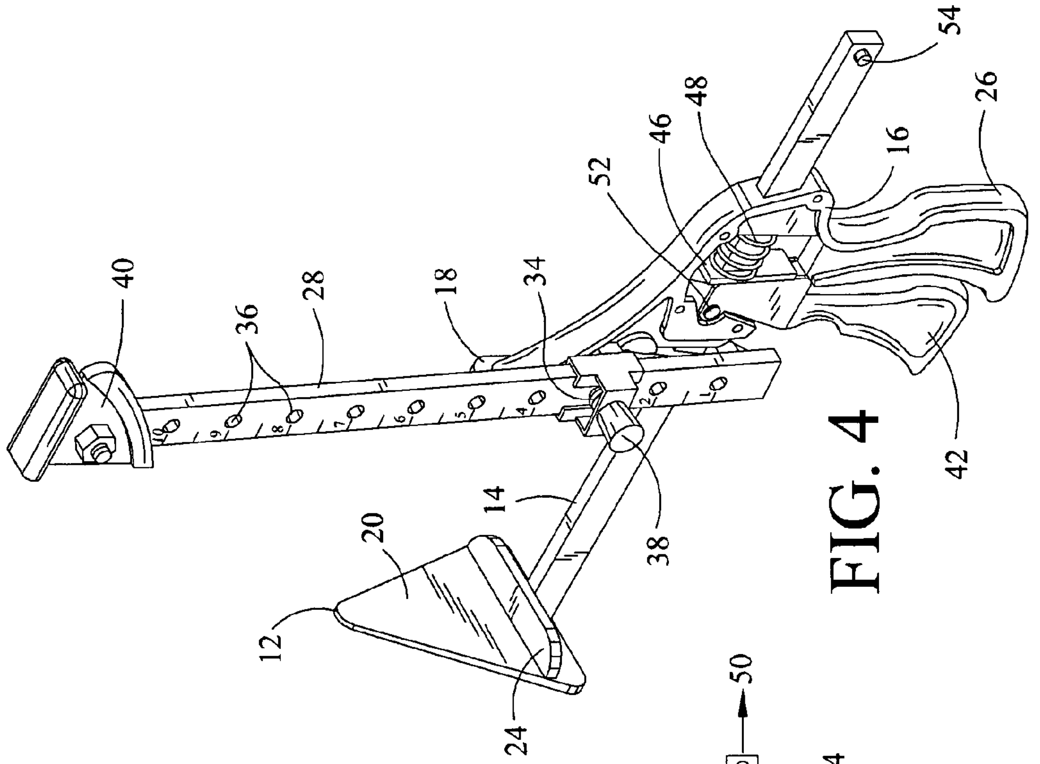
FIG. 4 is a perspective view illustrating an alternative embodiment of the hand tool for the installation and proper spacing of elongated horizontally overlapping siding on a vertical framework having a quick-action bar clamp wherein the moving jaw can be rapidly advanced or advances in small increments of selectable length, in accordance with the invention.

In an embodiment as illustrated in FIG. 4, the arm 28 is detented and is adjustably secured to the housing assembly via a spring fastener 34. In this embodiment the fastener assembly comprises a spring loaded tab configured to be received within corresponding detents 36 in the arm 28. Normally, the spring fastener 34 is loaded to secure the tab within a corresponding arm detent 36 to adjustably secure the arm 28 to the housing assembly 16. To adjust the arm 28 the spring load on the tab must be overcome by pulling the tab head 38 away from the arm 28. This action pulls the tab from its corresponding detent 36 and allows the arm 28 to move vertically among the arm detents, and angularly about the housing assembly 16. To resecure the arm 28 to the housing assembly 16 the pull force on the tab head 38 is released, and the biased spring force forces the tab into the desired corresponding detent 36.

In either embodiment arm 28 may be graduated, or ruled, in a variety of standard or metric units of measurement, such as inches, centimeters, or millimeters.

Adjustable stop member 40 is carried on one end of the adjustable arm 28 for receiving and supporting the bottom edge portion of the uninstalled siding piece. Adjustable stop member 40 prevents the uninstalled siding piece from sliding out of alignment with the installed siding piece. Adjustable stop member 40 preferably pivots about pivot point 41 from zero to ninety degrees.

The single direction drive system comprises advancement handle 42 pivotably mounted to the housing assembly 16 in engageable contact with the drive system for releasably engaging the slide bar 14 and when engaged, for advancing the slide bar and carried movable jaw 12 toward the stationary jaw 18.

In the embodiment illustrated the advancement handle is activated to engage the drive system by the rearward depression of the advancement handle by the hand or finger of a user.

The retention system comprises a retention handle 44 preferably extending outward from the housing forwardly of the advancement handle 42. The retention handle 44 normally frictionally engages the slide bar 14 preventing the slide bar 14 and movable jaw 12 from moving away from the stationary jaw 18.

In the embodiments illustrated, the retention handle 44 is disengaged from frictionally gripping the slide bar 14 by activating the retention handle 44. Typical activation is the rearward depressing of the retention handle 44 by the hand or finger (not shown) of a user. When the retention handle 44 is disengaged, the slide bar 14 and carried movable jaw 12 are permitted to move away from the stationary jaw 18.

The hand tool constructed in accordance with the present invention is grippable by the hand of a user about the handgrip 26, with the advancement handle 42 and retention handle 44 being selectively operable by the same user hand.

The hand tool constructed in accordance with the present invention permits a single person to manipulate long pieces of uninstalled horizontal siding and properly position and space the long pieces of uninstalled siding relative to an installed piece of siding. Horizontal siding pieces can be in lengths as long as twelve feet or more. The length and weight of these typical pieces means that it is extremely difficult to nearly impossible for a single person to handle, properly position, properly space and properly fasten horizontal overlapping siding pieces to a vertical framework.

The stationary jaw 18 and movable jaw 12 frictionally grip, or clamp, an installed siding piece. The stationary jaw 18 receives the exterior face of the installed siding piece, while the movable jaw 12 receives the interior face of the installed siding piece, and the moveable jaw plate 24 receives the bottom edge portion of the installed siding piece. The adjustable arm 28 is capable of two adjustments. The first, is an angular adjustment to account for the reducing taper of the exterior siding face. The second adjustment, is one of vertical adjustment to account for the width of the siding piece. The adjustable arm 28 positions adjustable stop member 40 in proper positional alignment, both angularly and vertically, to receive and support a bottom edge portion of an uninstalled siding piece for gluing, nailing or welding in place. Multiple hand tools of the present invention may be used in a series along the span of a vertical frame work acting as a clamp, a spacing and alignment tool, and as a third hand to permit a single person to handle, properly position, properly space and properly fasten horizontal overlapping siding pieces to a vertical framework.

The drive system comprises a driving lever 46 suspended on the slide bar 14 which passes through a hole in the driving lever 46. A spring 48 is compressed between the driving lever 46 and a surface of the housing cavity urging the driving lever 46 against the upper end of the advancement handle 42. The upper end of the advancement handle 42 and straddles the slide bar 14. Force of the spring 48 urges the advancement handle 42 against an inner surface of the housing 16 thus providing a normal condition. In the normal condition, the driving lever 46 is positioned perpendicular to the direction of motion, indicated by the arrow 50, of the slide bar 14 when in operation. Any motion of the advancement handle 42 about the pivot pin 52 in the direction of the arrow 50 is accomplished against the bias of the spring 48.

The retention system comprises a braking lever 44 suspended from the slide bar 14 which passes through an opening in the braking lever 44. One end of the braking lever 44 is pivotably captured within the housing 16 such that the braking lever 44 may pivot within constraints defined by the surfaces of the housing 16 and by binding of the braking lever 44 with the slide bar 14 when the edges of the opening in the lever 44 engage the surface of the slide bar 14. A brake spring in the housing 16 biases the free end of the braking lever 44 away from the advancement handle 42. The biased position of the braking lever 44 is limited by the binding interference between the opening of the lever 44 with the slide bar 14.

It should be noted that in the normal position illustrated in FIG. 3, the driving lever 46 is substantially perpendicular to the longitudinal axis of the slide bar 14, whereas the portion of the braking lever 44 which engages the slide bar 14 is transverse to the longitudinal axis of the bar 14 but not perpendicular thereto. In this condition, if a force is applied to the movable jaw 12 in the direction indicated by the arrow 50, the slide bar 14 is free to move through the hole in the driving lever 46 and through the spring 48. Because the braking lever 44 is free to pivot against the bias of the spring 48 when force is applied on the movable jaw 12 in the direction of the arrow 50, the braking lever 44 presents no obstacle to this motion of the slide bar and the movable jaw 12 may be advanced continuously toward the stationary jaw 18.

However, in the normal position as illustrated in FIG. 3, if a force is applied to the movable jaw 12 in the direction opposite to the direction indicated by the arrow 50, the edges of the opening in the brake lever 44 bind against the surface of the slide bar 14 and it is not possible, without further action, to withdraw the movable jaw 12 farther away from the stationary jaw 18. Compression of the brake spring by pressing on the braking lever 44 in the direction of the arrow 50, allows withdrawal of the slide bar 14 and movable jaw 12 away from the stationary jaw 18. This force brings the end of the brake lever 44 into perpendicularity with the direction of intended motion of the slide bar 14. Then the slide bar 14 is free to slide in either direction through the opening in the braking lever 44.

The advancement handle 42 is squeezed in the direction indicated by the arrow 50 to incrementally advance the slide bar 14 with its attached movable jaw 12 toward the stationary jaw 18. When the advancement handle 42 is squeezed between a user's hand (not shown) and the handgrip 26, pivoting occurs about the pivot pin 52 and the end of the advancement handle 42 moves in the direction of the arrow 50. This causes the driving lever 46 to pivot about its upper end, so that the driving lever 46 is no longer perpendicular to the direction 50 of intended motion of the slide bar 14. Pivoting the driving lever 46 compresses the spring 48 and also causes the edges of the hole through the driving lever 46 to bind against the surface of the slide rod 14. Binding occurs because the driving lever 46 is no longer perpendicular to the direction 50 of intended motion of the slide bar 14. Further motion of the advancement handle 42 causes the driving lever 46 to translate in the direction of the arrow 50. This motion further compresses the spring 48 and in the process, by means of the binding interference between the lever 46 and slide bar 14, advances the slide bar 14 and its connected movable jaw 12 toward the stationary jaw 18. The maximum distance of advance of the movable jaw 12 with one stroke of the advancement handle 42 is limited when the spring 48 is fully compressed or, in an alternative construction, the handle 42 strikes the inner surface of the handgrip 26.

However, the stroke of the advancement handle 42 can be through any lesser arc, thereby diminishing the distance the movable jaw 12 travels in a single stroke in proportion to the angle of the advancement handle stroke. Additional strokes may be applied to the advancement handle 42 of any magnitude until the jaws 12, 18 come together, or a siding piece is firmly gripped between them.

After the advancement handle 42 is fully pivoted in the direction of the arrow 50 about the pivot pin 52, release of the advancement handle 42 causes the return of the advancement handle 42, driving lever 46 and spring 48 to the position shown in FIG. 3 as a result of the compressive forces in the spring 48 urging the components toward the movable jaw 12.

A transverse pin 54 passing through the free end of the slide bar 14 prevents withdrawal of the slide bar 14 from the slot when the braking lever 44 is pressed in the direction of the arrow 50 and the movable jaw 12 is manually drawn away from the stationary jaw 18. It should be noted that operation of the advancement handle 42 is ineffective in accomplishing any motion of the slide bar 14 in the direction opposite to the arrow 50.

Protective pads 56 may be attached to the jaws 12, 18 to prevent marring of the exterior siding faces. In the illustrated embodiments in accordance with the invention, the slide bar 14 has a rectangular cross-section. In alternative embodiments in accordance with the invention, the slide bar 14 may be any shape, for examples, square, round, triangular, and the openings in the levers 44, 46, respectively are appropriately shaped for proper binding interference with the slide bar 14.

In summary, if it is considered that a siding piece is to be clamped between the jaws 12, 18, the movable jaw 12 can be advanced toward the stationary jaw 18 either in one continuous motion, merely by pushing in the direction of the arrow 50 on the movable jaw 12 or, by operating the advancement handle 42 in a series of strokes of length to be determined by the user. Large strokes may be used at first and small strokes later as the desired pressure is applied to the siding piece. During this advancing operation, the braking lever 44 prevents any backward motion of the slide bar

14 after each advance has been completed. While the braking lever 44 holds the bar 14, the advancement handle 42 is released. The spring 48 then returns the advancement handle 42 and driving lever 46 to the positions shown in FIG. 3, ready for another stroke. At any time when the user desires to retract the movable jaw 12 away from the stationary jaw 18, for example, to release a siding piece or to open the tool to receive a siding piece, it is only necessary to pull on the movable jaw 12 in the direction opposite to the arrow 50 while simultaneously compressing the brake spring by pressing on the braking lever 44 in the direction of the arrow 50.

It should be noted that all operations of the advancement handle 42 and braking lever 44 can be accomplished with the same hand while holding the hand tool 10 with that hand. Either the index or middle finger is in position to actuate the braking lever 44 as required while the other fingers encircle and contain the advancement handle 42 and handgrip 26.

While a preferred embodiment of the invention has been described using specific terms, such description is for illustrative purposes only, and it is to be understood that changes and variations may be made to the hand tool constructed in accordance with the invention that permits a single person to manipulate long pieces of uninstalled horizontal siding and properly position and space the long pieces of uninstalled siding relative to an installed piece of siding, its parts, and methods of manufacture, without departing from the spirit or scope of the following claims.

What is claimed is:

1. A hand tool for the installation of elongated horizontally overlapping siding on a vertical framework, the siding having a top edge portion, a bottom edge portion, an interior face and an exterior face, the hand tool comprising:

a stationary jaw;

a movable jaw opposing the stationary jaw, the movable jaw having an interior jaw face and a substantially flat exterior jaw face;

a horizontal plate carried on the interior jaw face of the movable jaw for receiving the bottom edge portion of an installed siding piece;

a slide bar, having a first bar end and a second bar end with a portion therebetween, the movable jaw being carried on the first bar end, the slide bar being movable to bring the movable jaw toward and away from the stationary jaw;

a housing, having an upper portion, a middle portion and a lower portion, the stationary jaw being carried on the upper portion of the housing, the middle portion having a channel formed therein for slidably receiving and supporting the slide bar, the lower portion having a handgrip;

an adjustable arm having two movements carried on the upper portion of the housing adjacent the stationary jaw wherein one said movement is vertical and other said movement is angular, for vertically and angularly adjustably aligning and positioning an uninstalled siding piece about an installed siding piece;

an adjustable stop member carried on one end of the adjustable arm, for receiving the uninstalled siding piece and preventing the uninstalled siding piece from sliding out of alignment with the installed siding piece;

wherein the hand tool is grippable about the handgrip, permitting a single person to manipulate long pieces of uninstalled vertical siding and properly position the long pieces of uninstalled siding relative to an installed piece of siding.

2. The hand tool of claim 1, wherein the movable jaw is polygonal.

3. The hand tool of claim 1, wherein the movable jaw is ovoid.

4. The hand tool of claim 1, wherein the adjustable arm is slotted.

5. The hand tool of claim 1, wherein the adjustable arm is ruled.

6. The hand tool of claim 1, wherein the adjustable arm is detented.

7. The hand tool of claim 1, wherein the adjustable stop member pivots from zero to ninety degrees.

8. A method for manufacturing a hand tool for the installation of elongated horizontally overlapping siding on a vertical framework, the siding having a top edge portion, a bottom edge portion, an interior face and an exterior face, the method comprising:

providing a stationary jaw;

providing a movable jaw opposing the stationary jaw, the movable jaw having an interior jaw face and a substantially flat exterior jaw face;

providing a horizontal plate carried on the interior jaw face of the movable jaw for receiving the bottom edge portion of an installed siding piece;

providing a slide bar, having a first bar end and a second bar end with a portion therebetween, the movable jaw being carried on the first bar end, the slide bar being movable to bring the movable jaw toward and away from the stationary jaw;

providing a housing, having an upper portion, a middle portion and a lower portion, the stationary jaw being carried on the upper portion of the housing, the middle portion having a channel formed therein for slidably receiving and supporting the slide bar, the lower portion having a handgrip;

providing an adjustable arm having two movements carried on the upper portion of the housing adjacent the stationary jaw wherein one said movement is vertical and other said movement is angular, for vertically and angularly adjustably aligning and positioning an uninstalled siding piece about an installed siding piece; and providing an adjustable stop member carried on one end of the adjustable arm, for receiving the uninstalled siding piece and preventing the uninstalled siding piece from sliding out of alignment with the installed siding piece.

9. The method of claim 8, wherein the movable jaw is polygonal.

10. The method of claim 8, wherein the movable jaw is ovoid.

11. The method of claim 8, wherein the adjustable arm is slotted.

12. The method of claim 8, wherein the adjustable arm is ruled.

13. The method of claim 8, wherein the adjustable arm is detented.

14. The method of claim 8, wherein the adjustable stop member pivots from zero to ninety degrees.

* * * * *